United States Patent [19]

Taliaferro

[11] Patent Number: 4,784,762
[45] Date of Patent: Nov. 15, 1988

[54] MAGNETIC TRAP

[76] Inventor: Sam W. Taliaferro, 3204 Chamblee-Tucker Rd., Tucker, Ga. 30341

[21] Appl. No.: 878,792

[22] Filed: Jun. 26, 1986

[51] Int. Cl.$^4$ ................................................ B03C 1/02
[52] U.S. Cl. ...................................... 210/85; 55/100; 210/222
[58] Field of Search ......... 55/100; 209/223 A, 223 R; 210/222, 223, 695, 85; 137/544

[56] References Cited

U.S. PATENT DOCUMENTS 3,343,676  9/1967  Tyrrell ................................ 210/223

FOREIGN PATENT DOCUMENTS 2029580  3/1980  United Kingdom ................ 210/222

Primary Examiner—Richard V. Fisher
Assistant Examiner—W. Gary Jones
Attorney, Agent, or Firm—Thomas & Kennedy

[57] ABSTRACT

A magnetic trap has a magnetically transparent sheet to one side of which a magnet is mounted to produce a magnetic field to the other side. A Hall effect sensor of a meter is mounted adjacent the magnet so as to sense the presence of ferrous debris collected in the magnetic field.

2 Claims, 2 Drawing Sheets

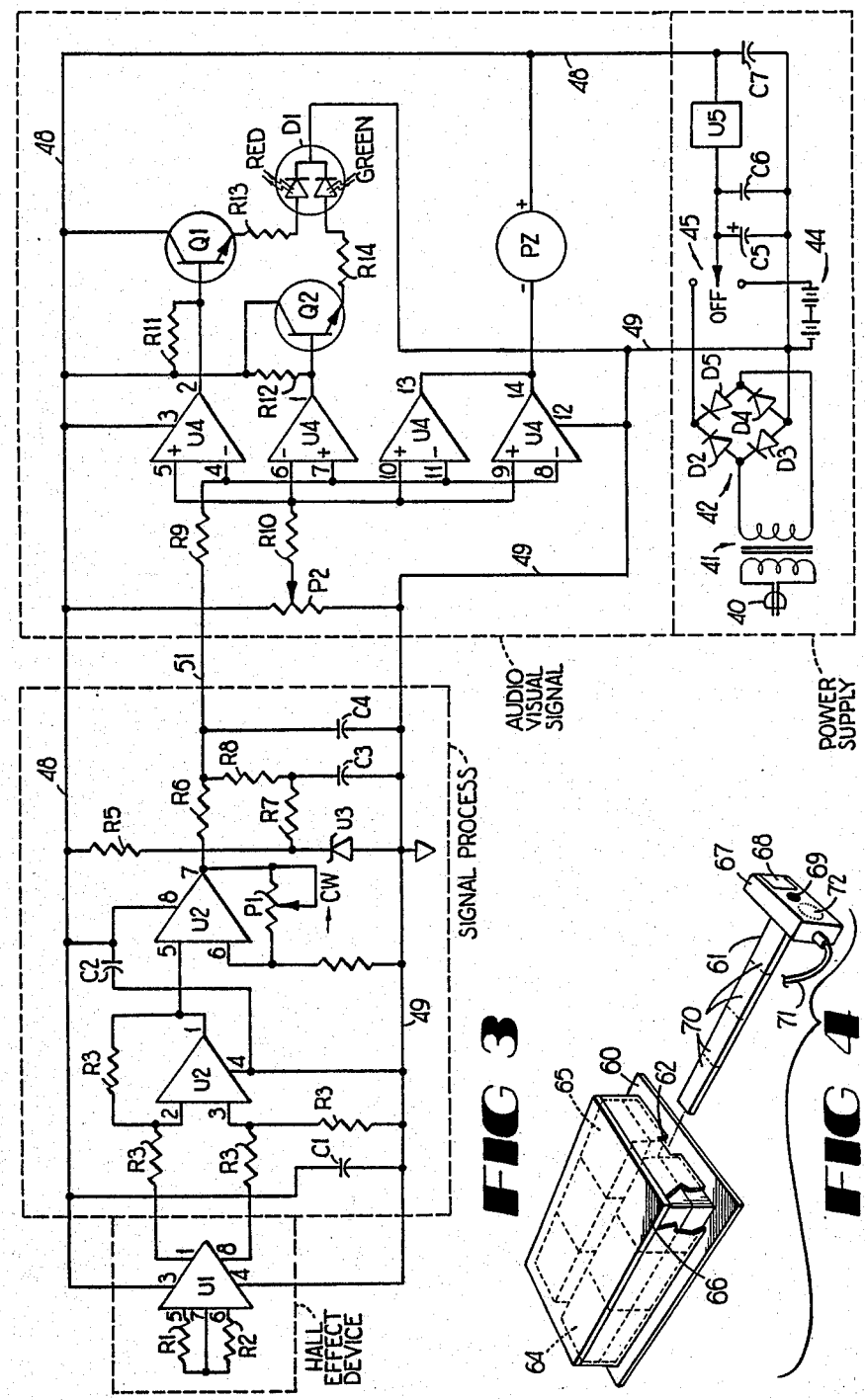

MAGNETIC TRAP

TECHNICAL FIELD

This invention relates generally to magnetic separators, and particularly to magnetic trap type separators such as those used as magnetic pipe traps to collect metallic debris in fluid streams.

BACKGROUND OF THE INVENTION

Magnetic separators are today used in a variety of applications that call for ferrous and non-ferrous materials to be separated. One such application is that wherein a device known as a magnetic trap is incorporated into a conduit to collect metallic debris that may happen to pass through the conduit. In some cases the presence of such ferrous materials is expected as where the trap is used in an engine oil circulation system. In other cases, such as with air ducts, the appearance of metallic objects in an air stream is unexpected but must be guarded against as a protective measure.

Proper incorporation of magnetic traps into conduits is not an easy task. For example, where an existing pipeline or duct system has to have a section of its wall removed to receive a magnetic trap, substantial care must be exercised to ensure that once incorporated the line or duct is completely resealed to avoid leaks. This particularly true where the fluid stream passing through the conduit contains fluids in their liquid state. In addition, a magnetic trap must often be incorporated into a pipeline or duct system in such a manner that it may be removed or accessed periodically for maintenance. It frequently occurs that traps are not actually cleaned until such time that the build-up of debris therein has reached a point restricting stream passage. This problem is commonly avoided through periodic inspections of the traps. However, this constitutes an inefficient trial and error technique that results in traps often being inspected more frequently than the need arising for cleaning.

Accordingly, it is seen that a need remains for a magnetic trap that may be easily and effectively incorporated into conduits and the like. A need also remains for a magnetic trap that is self monitoring with regard to the condition of the trap so that the existence of an actual need for maintenance may be easily recognized. Therefore, it is to the provision of such a magnetic trap that the present invention is primarily directed.

SUMMARY OF THE INVENTION

In one form of the invention a magnetic trap comprises a substantially magnetically transparent sheet and magnet means mounted to one side of the sheet for producing a magnetic field to the other side thereof. Magnetic field strength monitoring means is mounted to the one sheet side adjacent the magnet means with a magnetic field strength sensing probe positioned to sense the strength of the magnetic field for monitoring the collection of metallic objects to the other side of the sheet within the magnetic field.

In another form of the invention a magnetic trap comprises a substantially non-ferrous sheet and magnet means mounted to one side of the sheet forming a magnetic gap adjacent the sheet productive of a magnetic field to the other side thereof. Meter means is mounted to the one sheet side with a Hall effect probe positioned to sense the strength of the magnetic field for metering the collection of metallic objects caught in the magnetic field.

In yet another form of the invention a magnetic trap comprises a magnetically transparent pipe section adapted to be incorporated into a pipe. A pair of pole pieces is mounted to the inside of the pipe in mutually spaced relation to form a gap therebetween. A magnet is mounted to the outside of the pipe section magnetically coupled with the pole pieces through the pipe magnetically transparent section. Sensor means is mounted to the outside of the pipe for sensing the presence of metallic objects in the gap.

BRIEF DESCRIPTION OF THE DRAWING

FIG. 3 is a schematic diagram of an electronic circuit portion of the magnetic pipe trap illustrated in FIG. 1.

FIG. 4 is a perspective view of a magnetic trap embodying principles of the invention in an alternative form shown partially exploded.

DETAILED DESCRIPTION

Figure 1:
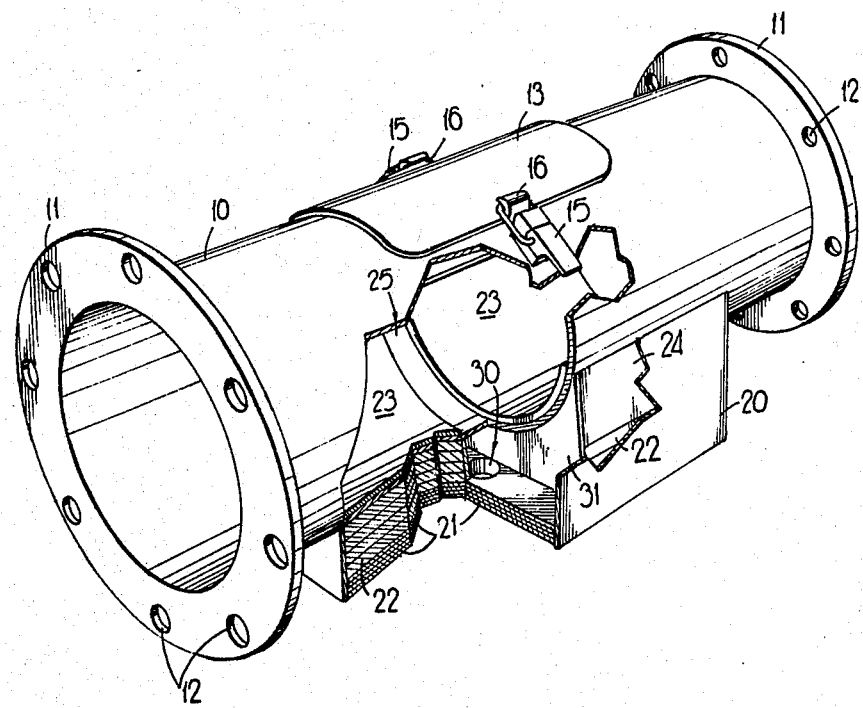
FIG. 1 is a perspective view of a magnetic trap embodying principles of the invention in one preferred form with portions shown cut away to reveal an interior portion.
Figure 2:
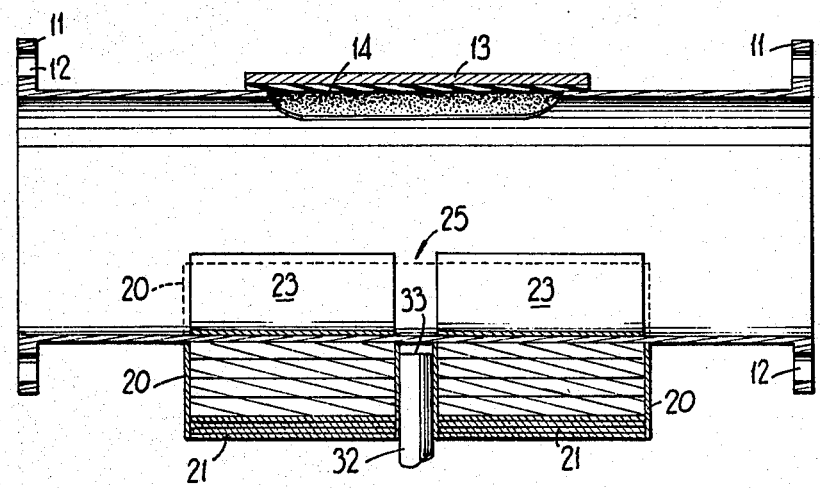
FIG. 2 is a transverse, cross-sectional view of the magnetic pipe trap illustrated in FIG. 1.

With reference next to FIGS. 1-3 of the drawing, there is shown a magnetic pipe trap comprised of a cylindrical pipe 10 having annular flanges 11 on opposite ends thereof adapted to be incorporated into a pipeline by fasteners extended through an annular array of holes 12 in the flanges. The material of which the pipe 10 is formed is a non-ferrous stainless steel. An access port is formed in an upper portion of the pipe that is covered by a stainless steel cover 13 which has a neoprene gasket 14 secured to the bottom thereof. The cover 13 is releasably held in place sealing the access port by means of two toggle clamps 15 mounted on the pipe that are releasably hooked to two catches 16 mounted along opposite sides of the cover.

With continued reference to the drawing, the magnetic pipe trap is further seen to include a housing 20 in which the pipe is cradled such that the housing may also function as a stand. Within the housing is stacked a set of permanent plate magnets 22 upon a set of steel back plates 21. A pair of ferrous, radius block type exterior pole pieces 24 is mounted atop the stack of permanent magnets in abuttment with the arcuate outer surface of the pipe 10 so as to cradle the pipe section 10. Two arcuate, sheet-like interior pole pieces 23 are mounted to the interior surface of the pipe 10 in mutually spaced relation to define a magnetic gap 25 therebetween which extends circumferentially along a bottom position of the pipe substantially midway between flanges 11 beneath the access port. As most clearly shown in FIG. 2, this structure provides a generally U-shaped magnet means with the set of plates 21 forming the bottom or bite portion of the U and with the ferrous radius blocks forming a majority of the legs of the U. Since the radius blocks are ferrous pole pieces and since the pipe 10 itself is non-ferrous and thus magnetically transparent, a magnetic field is formed by the magnet between the interior pole pieces 23 within the bounds of the pipe so as to bridge the gap 25. Thus, should a fluid stream flow through the pipe section 10, metallic objects within the stream would tend to be entrapped by the magnetic field and made to adhere to the interior pole pieces.

In FIG. 1 it is seen that a channel 30 extends vertically through the plate magnets 22 and between two partitions 31 of the housing 20. As shown in FIG. 2, this channel is configured and sized to receive a cylindrical probe 32 that extends upwardly through the channel so as to have its upper end 33 located closely adjacent the outer surface of pipe section 10 beneath the magnetic gap 25. This probe forms a portion of electronic menas for monitoring the strenght of the magnetic field within the bounds of the pipe 10 that spans the gap 25 between the two interior pole pieces 23. By monitoring the strength of the field a build-up of metallic objects collected by the trap upon the interior pole pieces and within the magnetic gap 25 can itself be monitored. As metallic objects overflow from atop a pole piece 23 over the gap the strength of the magnetic field decreases. As the gap is reduced or becomes actually bridged at places by metallic debris, the field decreases significantly in intensity. The electronic monitoring means thus is set to detect the point at which the strength of the field has decreased such as to require the trap to be cleaned. The monitoring means here is coupled with both visual and audio alarms for alerting attendants to the existence of a condition requiring trap maintenance. Once alerted, a worker may temporarily arrest the flow of a stream flowing through the pipe section, remove the access cover 13, and clean objects from the surface of the pole pieces and from the magnetic gap.

With reference next to FIG. 3, the magnetic field strength monitoring means is seen to comprise a Hall effect sensor U1, such as a Sprague UGN-3501, which is coupled with signal process circuitry and with an audio/visual signal circuitry, all powered by a power supply. The power supply is seen to include an plug 40 adapted to be coupled with a municipal source of 115-volt AC power. The cord is connected to a voltage step-down transformer 41 to provide 12-VAC across a full-wave rectifier 42 comprised of diodes D2–D5. The output of the rectifier is placed across one set of terminals of a double throw switch 45. The power supply also includes a battery pack 44 whose output is placed across another set of terminals of the switch 45. A voltage regulator U5 and a bank of filtering capacitors C5, C6, and C7 are provided for damping and filtering any pulsating DC. The output from the power supply is coupled via bus conductors 48 and 49 to the audio/visual signalling circuitry, to the signal process circuitry, and to the Hall effect sensor. Preferably, all of the entire circuitry, except for the plug 40 and its cord, is housed with the probe 32 that is partially shown in FIG. 2.

The Hall effect device includes a sensor U1 to which two biasing resistors R1 and R2 are coupled. The sensor U1 generates dual outputs at pins 1 and 8 which are fed through two current limiting resistors R3 to the first of a package of two type LM 358 operational amplifiers U2. The first of these includes a feedback line with a resistor R3 from pin 1 to pin 2 and a biasing resistor coupled between pin 3 and the negative bus line 49. The output of pin 1 of the first operational amplifier U2 is inputed to pin 5 of the second operational amplifier U2. A noise suppressing capacitor C2 is coupled here across the two bus lines 48 and 49. A potentiometer P1 is connected across pins 6 and 7 of U2 to provide manual gain control. Thus, it is seen that the first operational amplifier is used to convert the dual output from the Hall Effect device to a single, manually adjustable output which is fed to the audio/visual signal circuitry.

The signal process circuitry also includes a temperature sensor U3 which is used here to offset the temperature drift of the Hall effect device. Biasing resistor R5 connects the temperature sensor to the plus voltage bus line 48. Resistors R6, R7 and R8 are connected to the output from the second operational amplifier U2 and the temperature sensor forming a summing circuit. Capacitors C3 and C4 provide noise suppression.

Within the audio/visual signal circuitry is another potentiometer P2 with current limiting resistor R10 which may be manually set to set a trigger point to establish threshold detection for sounding and displaying an alarm signal. Here, a set of 4 type LM339 voltage comparators U4 are used to activate the alarms. The outputs of two of these voltage comparators are fed to a piezoelectric type audio alarm PZ. A visual alarm is provided by a dual color LED device D1. D1 is coupled with the other two voltage comparators through switching transistors Q1 and Q2 via current limiting resistors R13 and R14. Pull up resistors R11 and R12 couple the bases of the transistors to the high voltage line 48 while current limiting resistor R9 couples the negative pin of one voltage comparator and the positive pin of the other with the output from the signal process circuitry.

The just described circuitry provides manual gain control means for controlling the strength of the signal emitted by the Hall effect device to establish an output signal to the audio/visual signal circuitry that is representative of the strength of the magnetic field detected by the Hall effect device. The audio/visual signal circuitry includes the potentiometer P2 for manually establishing the threshold signal level which, upon being reached, causes both an audio and a visual signal to be emitted by the signal portion of the circuitry.

For use the magnetic pipe trap is connected to a network of pipes through which a liquid stream may flow that may carry solid, metallic objects. Where the pipeline is non-ferrous the trap may be incorporated without cutting into that portion of the conduit where the magnetic field is to be established. This eliminates the need for seals. When incorporated into the line a magnetic field is generated within the pipe 10 between the two interior pole pieces 23 across the gap 25. As objects within the fluid flowing through the conduit into the field they tend to cling to the pole pieces. In time the build-up of these objects may cause the gap 25 to become reduced or bridged at one or more locations. This occurrence reduces the effectiveness of the trap and also obstructs the line thereby necessitating cleaning. With the present type magnetic trap this condition is timely recognized and an alarm generated.

With reference FIG. 4 an alternative embodiment is shown which is particularly well suited for use with relatively wide ductwork. It should be noted that the apparatus illustrated here is inverted from that shown in FIG. 1, for clarity of illustration. The magnetic trap comprises a face plate 60 which is non-ferrous and there magnetically transparent. An elongated, substantially linear probe 61 is seen to be inserted within a channel indicated at 62 flush atop the face plate 60 between two stacks of preferably C5 type magnets 64 and 65. A ferrous backplate 66 is mounted upon the stack so as to form the bite of the generally inverted, U-shaped magnet assembly. The probe 61 thus is inserted between the poles of the inverted, U-shaped magnet means.

The probe 61 extends from a housing 67 in which a battery pack 68 may be replacably inserted. An LED-type signal lamp 69 is mounted to the face of this housing as is an audio speaker 72. A conductor line 71 extends from this housing to an unshown remote alarm. So constructed, the face plate 60 may be mounted flush against a non-ferrous duct whereupon a magnetic field from the U-shaped assembly of magnets is formed within the bounds of the duct work. Alternatively, the face plate 60 may be an integral part of the ductwork itself. Preferably, the interior pole pieces and an access port are also provided.

Within the probe 61 is mounted, at spaced intervals, a series of Hall effect devices 70. These devices are ganged so that their outputs are summed so that this joint output is representative of the overall metallic debris collection condition along the magnetic gap within the duct to which it is mounted. This provides means for monitoring the overall condition of the magnetic gap within the trap rather than just an area in the vicinity of a single probe. Therefore, a quite accurate monitoring system is provided here for detecting the need for cleaning of the trap as indicated by the aggregate reduction in magnetic field along the entire width of the magnetic gap.

It thus is seen that a magnetic trap is provided which overcomes problems commonly associated with those of the prior art. It should, however, be understood that the just described embodiments merely illustrate principles of the invention in two preferred forms. Many modifications may be made thereto without departure from the spirit and scope of the invention as set forth in the following claims.

I claim:

1. A magnetic trap comprising a substantially non-ferrous sheet, magnet means mounted to one side of said sheet forming a magnetic gap adjacent said sheet productive of a magnetic field to the other side of said sheet; and meter means mounted to said one sheet side with a Hall effect probe positioned to sense the strength of said magnetic field for metering the collection of metallic objects caught in the magnetic field by the trap, and wherein said magnet means is U-shaped having a pair of legs joined by a bight with the leg ends being mounted adjacent said sheet, and wherein said probe is positioned between said legs and extends through said bight between said legs to terminate closely adjacent said sheet.

2. A magnetic pipe trap comprising a magnetically transparent pipe section adapted to be incorporated into a pipe, a pair of pole pieces mounted to the inside of said pipe in spaced relation forming a gap therebetween, a magnet mounted to the outside of said pipe section and magnetically coupled wtih said pole pieces through said pipe section, and sensor means mounted outside of said pipe for sensing the presence of metallic objects in said gap, and wherein said trap has a channel extending through said magnet to an area of said pipe section located between said pole pieces along said gap in which said sensor means is mounted, and a Hall effect probe of a meter mounted within said channel for sensing the strength of the magnetic field within said gap.

* * * * *